US007328207B2

(12) United States Patent
Dumitru et al.

(10) Patent No.: US 7,328,207 B2
(45) Date of Patent: Feb. 5, 2008

(54) EXTENSIONS FOR QUERY PERSISTENCE ACROSS REQUESTS WITH DYNAMIC UPDATE FOR WRITEBACK

(75) Inventors: Marius Dumitru, Issaquah, WA (US); Mosha Pasumansky, Redmond, WA (US); Raman Iyer, Redmond, WA (US); Thomas P. Conlon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 10/922,517

(22) Filed: Aug. 20, 2004

(65) Prior Publication Data
US 2006/0053091 A1     Mar. 9, 2006

(51) Int. Cl.
*G06F 17/30* (2006.01)
*G06F 15/16* (2006.01)
(52) U.S. Cl. ............. 707/3; 707/4; 707/5; 709/217
(58) Field of Classification Search ............ 707/2, 707/3, 5
See application file for complete search history.

(56) References Cited

U.S. PATENT DOCUMENTS

| 6,473,764 | B1  |   | 10/2002 | Petculescu et al. ....... 707/102 |
| 6,879,984 | B2  | * | 4/2005  | Duddleson et al. ....... 707/101 |
| 2003/0225769 | A1 |   | 12/2003 | Chkodrov et al. ....... 707/100 |
| 2004/0088433 | A1 | * | 5/2004  | Kaler et al. ............ 709/246 |

OTHER PUBLICATIONS

Kalnis, P. et al., "Multi-Query Optimization for On-Line Analytical Processing", *Information Systems*, 2003, 28, 457-473.
Kalnis, P. et al., "Optimization Algorithms for Simultaneous Multidimensional Queries in OLAP Environments", *Data Warehousing and Knowledge Discovery, 3rd International Conference, Lecture Notes in Computer Science*, 2001, 2114, 264-273.
Liu, W-Y. et al., "OLAP Realization technology Research Based on MDX", *Proceedings of the First International Conference on Machine Learning and Cybernetics*, 2002, 4, 2205-2209.
Vaisman, A.A. et al., "Supporting Dimension Updates in an OLAP Server", *Advanced Information Systems Engineering 14th International Conference, Lecture Notes in Computer Science*, 2002, 2348, 67-82.
Zhao, Y. et al., "Dimensional Queries", *SIGMOD Record*, 1998, 27(2), 271-282.

* cited by examiner

*Primary Examiner*—Tony Mahmoudi
(74) *Attorney, Agent, or Firm*—Woodcock Washburn LLP

(57) ABSTRACT

A method is described herein for causing an analytical database server to store query results in a memory. In the method, a first header element and a request to query an analytical database is received. The first header element indicates that a query result should be stored. The analytical database is queried according to the request, and the query result is stored. An identifier associated with the query result and a second header element corresponding to the identifier is then transmitted.

29 Claims, 5 Drawing Sheets

EXTENSIONS FOR QUERY PERSISTENCE ACROSS REQUESTS WITH DYNAMIC UPDATE FOR WRITEBACK

FIELD OF THE INVENTION

The present invention relates to analytical databases. More particularly, the present invention relates to causing an analytical database server to retain query results to enable interaction with the data without requiring the modification of data that is permanently stored in the database.

BACKGROUND OF THE INVENTION

Databases are used to store large amounts of data and make such data accessible to one or more users. A typical database configuration is to have one or more servers in communications with a database, which may be stored in any type of data storage device, and one or more clients. The clients request the data by way of a query. A query specifies the type of data desired and operates much like a search. For example, in a database containing information pertaining to a business' customer list, a client may desire the names and addresses of all customers that have purchased a particular product. Thus, a query may specify the type of data requested (customer name and address) and the criteria for selection (the product). The server finds the data entries having the purchased product, and returns the customer name and address information.

In many business, academic and other environments, the amount of data stored in a database may be extremely large. To accommodate such data, databases may be organized in a number of different ways. Two significant types of databases are relational and analytical databases. A relational database takes the form of tables having rows and columns that show the relationships between items in the database. In the customer list example discussed above, for example, customer data may be located in the rows of the table, and the product information may be located in the columns. Multiple tables may be related to each other, and an item change in one table affects other, related tables. One language that can used to query and process data in a relational database is Structured Query Language (SQL).

Relational databases typically enable a "prepare" operation that does much of the upfront work that is carried out on the server before the server can begin sending results back to the client. The prepare operation includes validating the query sent by the user and creating an execution plan that determines the most efficient way to execute the query. The prepare operation is useful if the same query is to be executed multiple times (possibly with different parameters for each query), thereby allowing the upfront preparation costs to be amortized over those requests.

Another type of database is an analytical, or multidimensional, database. Rather than having tables of two-dimensional data, as in a relational database, an analytical database contains data that may be represented as three-dimensional data "cubes." Thus, an analytical database provides for more complex relationships between data items. An analytical database is also optimized for data warehousing and Online Analytical Processing (OLAP) applications. An analytical database can, in some instances, be created by using a relational database as input. In contrast to the SQL queries used to interact with a relational database, however, analytical databases can be accessed with Multidimensional Expressions (MDX), which can be implemented using extensible Markup Language for Analysis (XMLA). MDX syntax permits a user of an analytical database to perform functions with the data that are more sophisticated than those available to users of relational databases. For example, a high-level database user such as a strategic planner for a business may wish to perform a "what-if" analysis of the data. In such an analysis, the user queries the database to request a certain selection of the data and the data is analyzed to determine the effects of possible changes in market conditions, business decisions, etc.

In conventional analytical database systems, the query results are sent to the client requestor and then immediately cleared from the server. The immediate clearing of the data from the server is performed to increase efficiency. For example, an analytical database, containing highly-complex three-dimensional data as discussed above, may be extremely large, and there may be many different clients of the server that are concurrently submitting query requests. The results of such queries may also be very large. Thus, a design tradeoff reduces the time and resources that are required to service numerous requests from multiple clients on the often vast amount of stored data by eliminating query results as soon as they are sent to a requesting client.

In some situations, however, it would be advantageous to prepare a query execution plan, as is possible in relational database systems. It would be even more advantageous to be able to store query results in an analytical database environment because the types of sophisticated queries that are performed on an analytical database typically lead to follow-up queries, additional analysis of previous query results, and so forth. For example, a user who performs a what-if analysis will typically want to ask follow-up what-if type questions to see if or how the results might change. In addition, one or more "writeback" operations may be desired during such a process.

For example, a user may query the analytical database to perform a what-if scenario. A what-if scenario typically involves changing one or more query parameters and then determining what occurs as a result. For example, an initial what-if scenario for a store might be to query a sales database to predict the increase in sales that could result from sending 10% discount coupons to consumers in a particular geographic area. A follow-up what-if scenario could be to predict the sales increase that might result from sending 20% coupons, or from sending 10% coupons to a different geographic area, and so forth. Upon viewing the results, the user may want to know more about the scenario by performing additional queries and/or functions on the data as it exists in the what-if scenario. For example, the follow-up what-if scenario could assume that the 10% coupons were sent, and then assume additional factors using the previously-determined query results. Thus, the additional queries and/or functions are performed on the query result data that is written back as though the result data is the "real" data stored in the analytical database. As the result data is only used for purposes of the user's what-if scenario, it can be seen that such a writeback operation should ideally be performed without actually overwriting the data stored in the database unless the user specifically desires to overwrite such data.

In conventional analytical database environments, the XMLA standard describes Simple Object Access Protocol (SOAP) header XML elements that initiate a stateful session between a client and an analytical database server. However, the standard currently lacks a mechanism to enable a client to request the server to execute a query, store the query results in server memory, and also dynamically update the in-memory stored result due to writeback operations. In light of the design tradeoff noted above, enabling such a mechanism would be counter-intuitive because it would force the server to take additional processing time and resources to store query results in memory and then permit client interaction with the query results. Nevertheless, the ability to perform such follow-up querying and writeback operations make the storage of query results highly desirable in such limited instances.

As noted above, relational databases enable the preparation of a query execution plan, which optimizes the query process for multiple queries by first planning out an optimal query methodology. As was also noted above, conventional analytical database environments lack the ability to store query results, and therefore such environments do not enable the optimization of queries. For example, neither OLAP nor XMLA provide a mechanism for the "prepare" and "query execution plan" features that are available in conventional relational database environments. Such features would be highly desirable in an analytical database environment because of the highly complex queries that are typically involved.

Furthermore, the ability to have an analytical database server store query results would enable the server to return portions of the results to a requesting client. For example, users of analytical databases are conventionally unable to receive parts of a query result at a time. Instead, such users typically have to receive the entire result and store the result in local memory and/or storage, and display the appropriate parts of the data. Alternatively, the client reads only the amount of data that can be displayed and blocks the network connection until the client can discard the current batch of data and fetch the next block of data.

Accordingly, what is needed is a mechanism to enable the temporary storage of query results in an analytical database environment. More particularly, what is needed is a mechanism for enabling true "what-if" scenario testing, while keeping permanently stored data insulated from any of the effects of an attendant writeback operation. Even more particularly, what is needed is a mechanism to enable the preparation of a query execution plan for one or more intended queries of an analytical database. Furthermore, what is needed is a mechanism that enables an analytical database server to store a query result and transmit parts of the result to the requesting client

SUMMARY OF THE INVENTION

In view of the above shortcomings and drawbacks, a method is described herein for causing an analytical database server to store query results apart from the permanent database. By doing so, the method enables follow up functions on the query results to be performed efficiently, as well as the creation and storage of an analytical database query plan. In the method, a first header element and a request to query an analytical database is received. The first header element indicates that a query result should be stored. The analytical database is queried according to the request, and the query result is stored. An identifier associated with the query result and a second header element corresponding to the identifier is then transmitted.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Overview

Several query elements are provided by an embodiment of the present invention for use in, for example, a SOAP header. The elements enable a client and server to communicate with each other about the initiation, use and release of a query result. Using such elements, a client can direct a server to retain the result of a Discover or Execute command, or the like. The server provides the client with a subelement that the client can use in subsequent XMLA commands to access the appropriate, saved query result within the session state.

Also provided are elements in the SOAP body that, in an embodiment, are used for writeback operations. Thus, a client may send a command using such an element to perform a writeback operation. The command contains an element that instructs the server to adjust all cells contained within the saved result to reflect the update. Finally, when the client is finished with that particular result, it can send a command to the server to either clear the result or commit the result to memory.

Before discussing the invention in detail, we will first describe exemplary computing and network environments in which the invention may be advantageously practiced.

Exemplary Computing Environment

Figure 1:
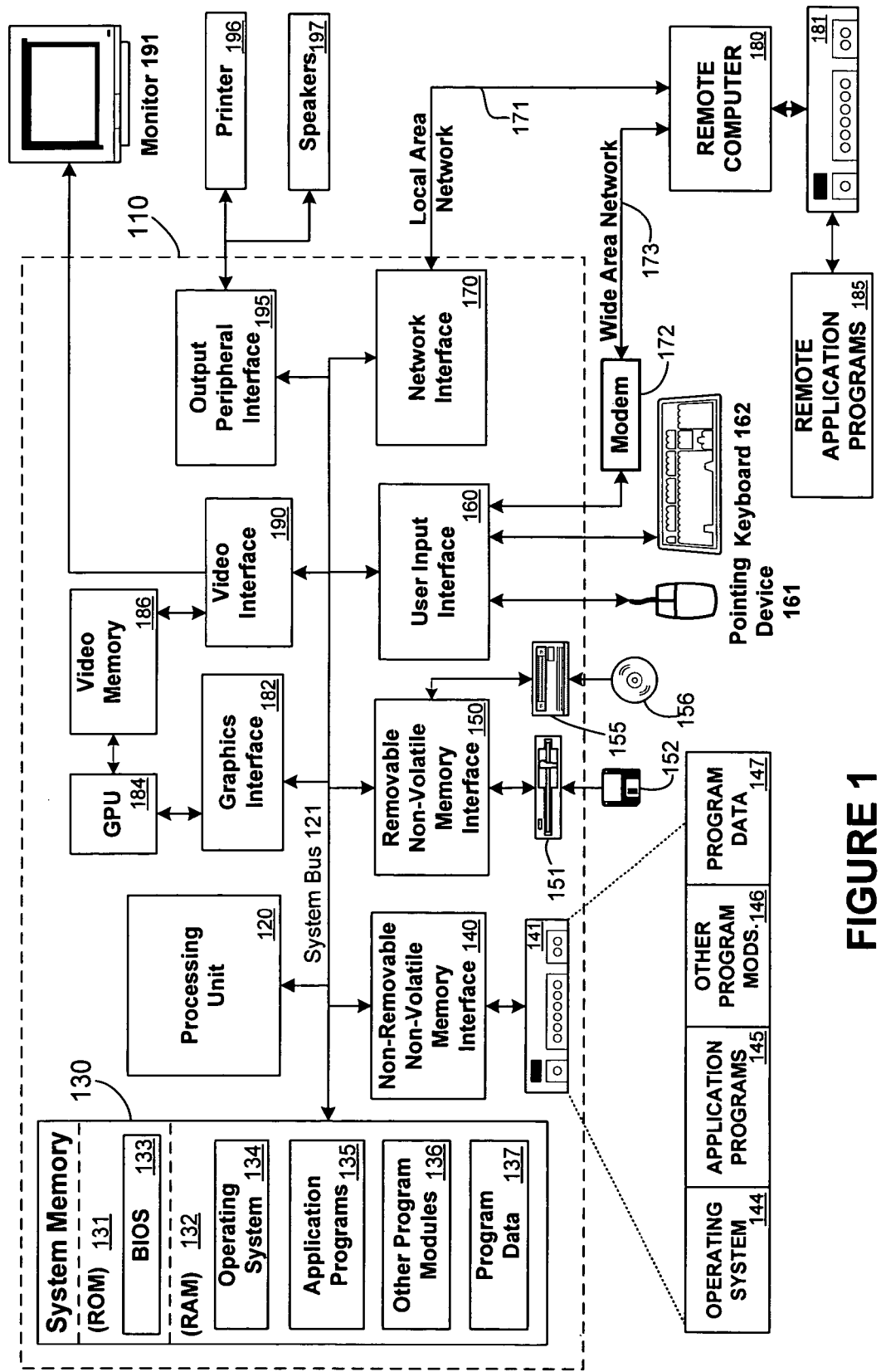
FIG. 1 is a diagram illustrating an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Network Environment

Figure 2:
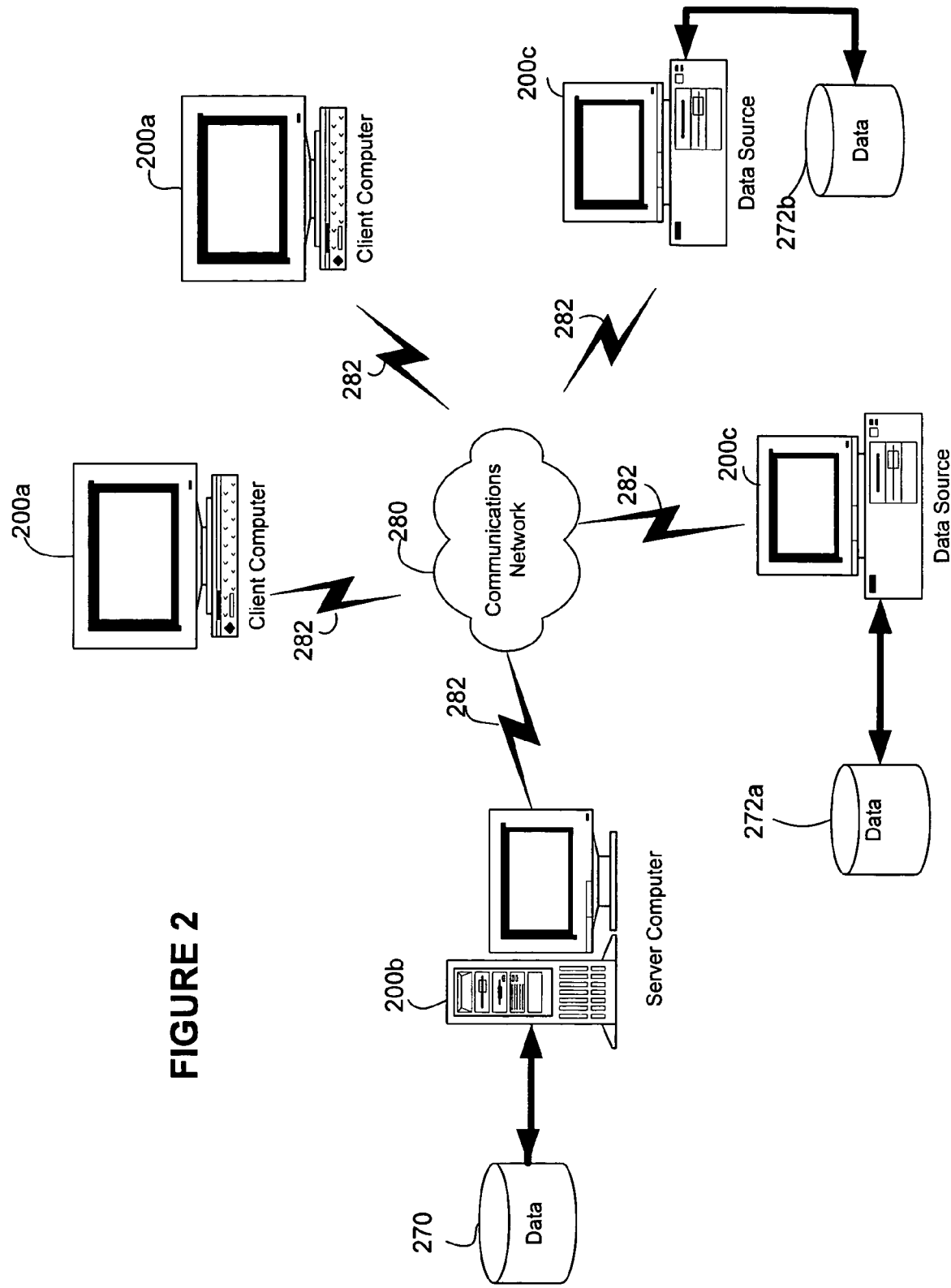
FIG. 2 is diagram illustrating a computer network in which aspects of embodiments of the present invention may be incorporated.

FIG. 2 illustrates an exemplary network environment in which the present invention may be employed. Of course, actual network and database environments meay be arranged in a variety of configurations; however, the exemplary environment shown here provides a framework for understanding the type of environment in which an embodiment may operate.

The network may include client computers 200a, a server computer 200b, data source computers 200c, and databases 270, 272a, and 272b. The client computers 200a and the data source computers 200c are in electronic communication with the server computer 200b by way of the communications network 280 (e.g., an Intranet). The client computers 200a and data source computers 200c are connected to the communications network by way of communications interfaces 282. The communications interfaces 282 can be any type of communications interfaces such as Ethernet connections, modem connections, wireless connections and so on.

The server computer 200b provides management of the database 270 by way of database server system software such as, for example, MICROSOFT SQL SERVER. As such, server 200b acts as a storehouse of data from a variety of data sources and provides that data to a variety of data consumers.

In the exemplary network environment of FIG. 2, data sources are provided by data source computers 200c. Data source computers 200c communicate data to server computer 200b via communications network 280, which may be a LAN, WAN, Intranet, Internet, or the like. Data source computers 200c store data locally in databases 272a, 272b, which may be database servers or the like. The data provided by data sources 200c can be combined and stored in a large database such as a data warehouse maintained by server 200b.

Client computers 200a that desire to use the data stored by server computer 200b can access the database 270 via communications network 280. Client computers 200a request the data by way of MDX queries on the data stored in database 270. It will be appreciated that any configuration of computers is equally compatible with an embodiment of the present invention.

Conventional Analytical Database Query

Figure 3:
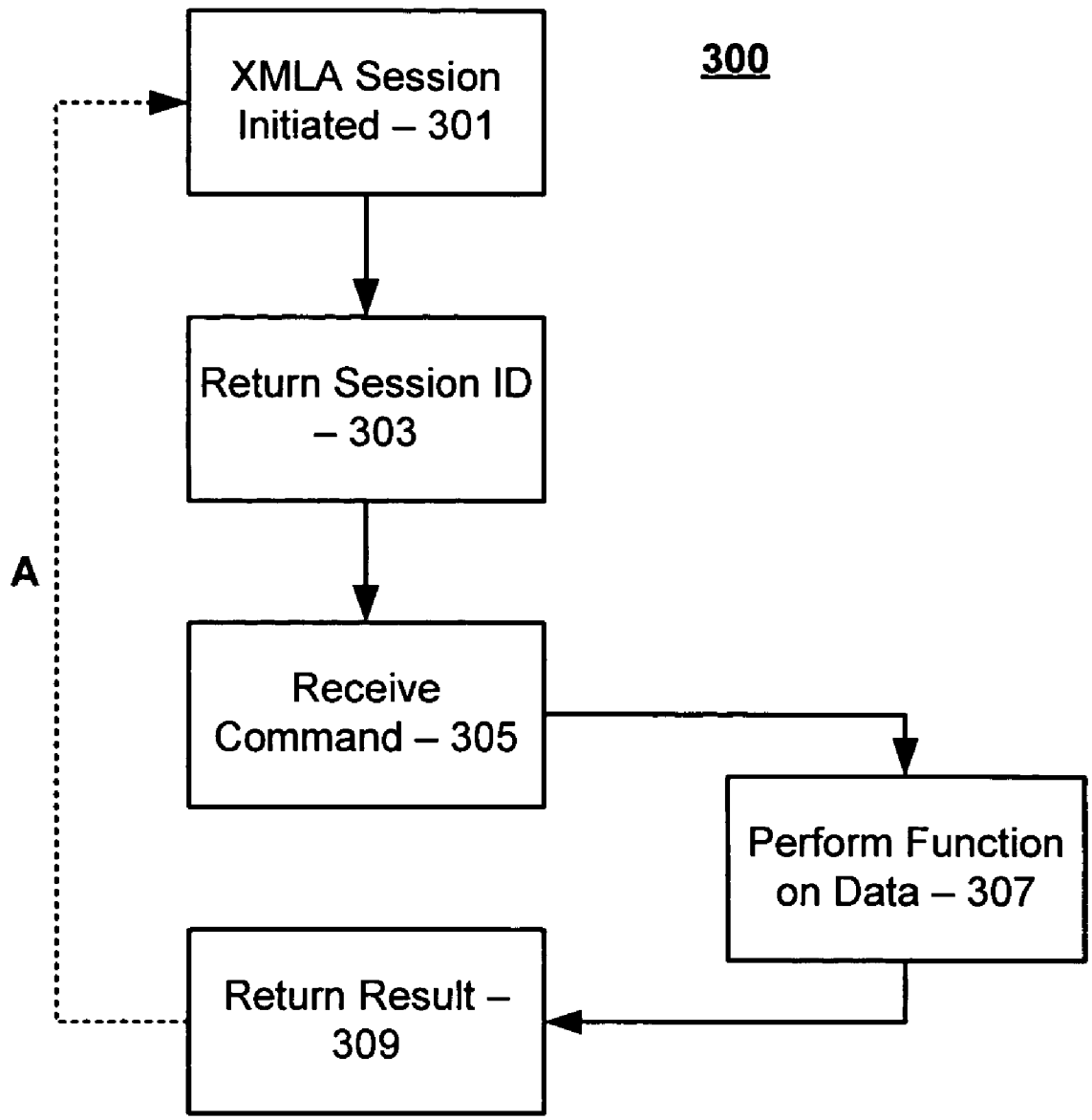
FIG. 3 is flowchart illustrating a conventional method of querying an analytical database.

A flowchart illustrating a conventional method 300 of querying an analytical database is presented in FIG. 3. At step 301 of FIG. 3, an XMLA session is initiated. Typically, such an initiation takes place when a client sends an XMLA command to an analytical database server such as, for example, databases 270, 272a, and 272b as was discussed above in connection with FIG. 2. At step 303, upon receiving an initiation command from a session identifier (ID) is returned from the database server. As was noted above, many clients may be simultaneously requesting queries from the server. Therefore, the session ID is, for example, a string that enables the client to communicate with the server regarding the appropriate query result.

At step 305, the database server receives a command from a client, where the command requests that a function be performed on the data. In some situations, step 301 and 305 are combined, in which case steps 303 and 309 would also be combined. In any event, the command of step 305 is typically a query request. At step 307, the database server performs the function specified by the command on the data in the analytical database. Finally, at step 309, the database server returns the result to the client. Significantly, the query result is not retained in memory at the server, as it is typically cleared from memory either immediately upon transmitting the query result to the client, or at some predetermined period afterwards.

Arrow A indicates the path that is taken if the client wishes to perform another function on the data. As noted above, such a situation may arise when the client wishes to follow up on a what-if query with another what-if query that is to be performed on the first query's results. In the method 300 of FIG. 3, unfortunately, even if the client wishes to perform a function on the previously-generated result, the entire process must be repeated when operating in a conventional analytical framework. Accordingly, a client wishing to perform a function multiple times, or to perform a function on previously-generated results, should incorporate all of the necessary instructions in the command of step 305 because the results will not be stored by the server, and therefore follow-up functions cannot be performed.

Description of Embodiments of the Present Invention

As was noted above, an embodiment provides XMLA elements in a SOAP header for the client and server to communicate with each other about initiation, use, and release of query results. Also, an embodiment also provides additional elements in the SOAP body that are used for writeback operations.

Figure 4:
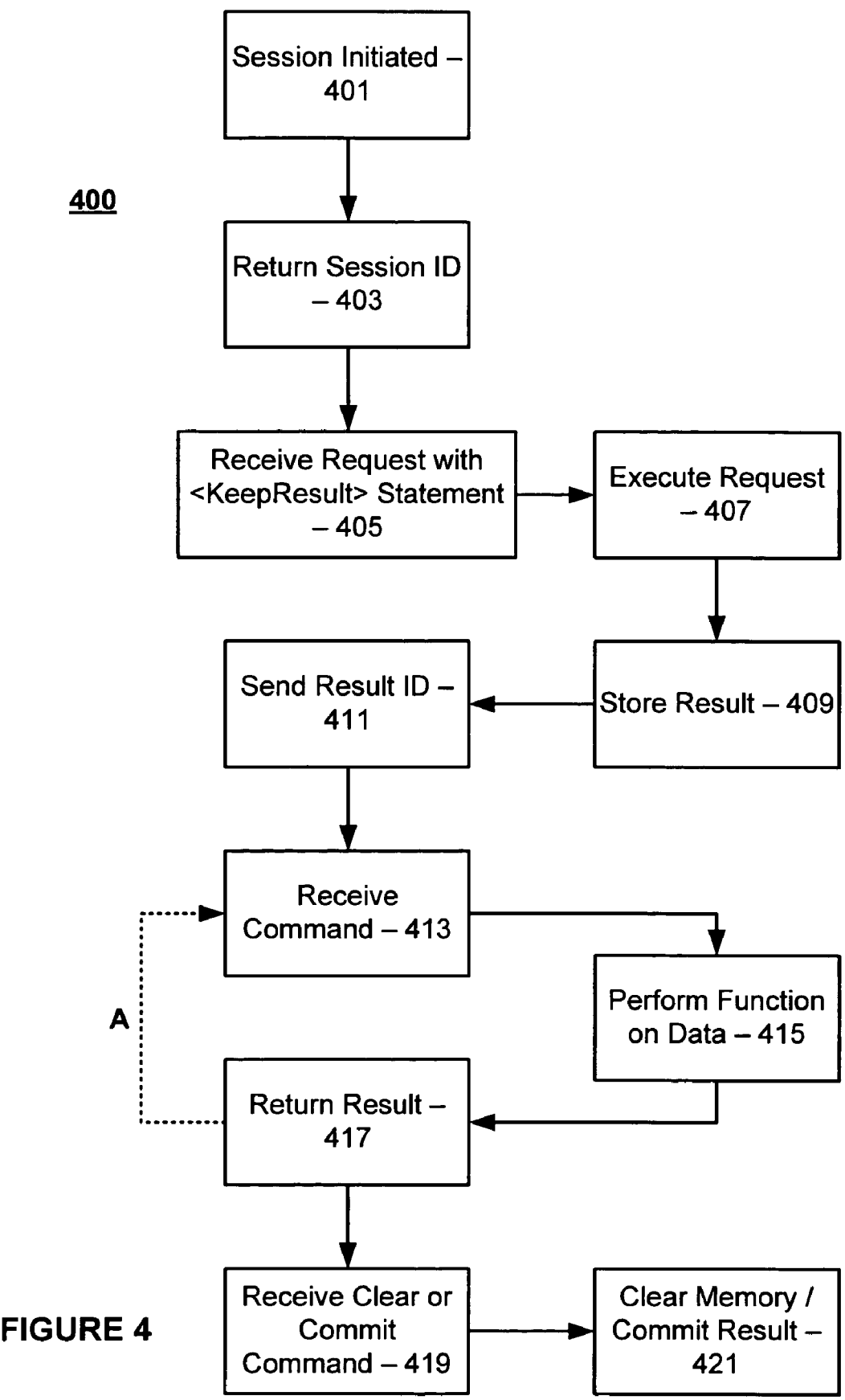
FIG. 4 is flowchart illustrating an exemplary method of querying an analytical database according to an embodiment of the present invention.

Turning now to FIG. 4, an exemplary method of querying an analytical database according to an embodiment of the present invention is illustrated. In the discussion that follows, it will be appreciated that the various SOAP headers that are used in an embodiment may be implemented using any type of software component. For example, in some embodiment the headers—meaning the ability to recognize the header and the functionality to perform the header's corresponding task—are enabled by an Application Program Interface (API), while in other embodiments the headers may be enabled by a stand-alone program or the like. It will also be appreciated that the exact syntax used in the headers herein is for explanatory purposes only, as any choice of header syntax is equally consistent with an embodiment of the present invention. In FIG. 4, the method 400 enables a client to initiate a session with a server. As an initial matter, it will be appreciated that, in an embodiment, a single command could perform multiple steps. For example, steps 401 and 405 could be performed at the same time by a single command, or combination of commands sent together, and then steps 403 and 411 could be performed at the same time as well. Thus, it will be appreciated that the discussion that follows in connection with FIG. 4 is purely for explanatory purposes, as any configuration of commands and steps is consistent with an embodiment.

At step 403, a session ID is returned from the server to the client for use in subsequent commands relating to the present session with the server. At step 405, the server receives a request with a statement indicating to the server that a result of a specified function should be retained in memory. For example, exemplary SOAP syntax for performing step 405, in one embodiment, is illustrated below in Table 1.

TABLE 1

```
<SOAP-ENV:Envelope
   xmlns:SOAP-ENV="http://schemas.xmlsoap.org/soap/envelope/"
   SOAP-ENV:encodingStyle="http://schemas.xmlsoap.org/soap/encoding/">
<SOAP-ENV:Header>
```

TABLE 1-continued

```
   <KeepResult
       xmlns="http://schemas.microsoft.com/analysisservices/2003/
       xmla"
       mustUnderstand="true"/>
   </SOAP-ENV:Header>
   <SOAP-ENV:Body>
   ...<!-- Discover or Execute call goes here.-->
   </SOAP-ENV:Body>
</SOAP-ENV:Envelope>
```

As can be seen in Table 1, above, the <KeepResult> SOAP header (shown in Table 1 in bold typeface) issues a request to the server to persist the result in local memory. The <KeepResult> element, sent by the client in the SOAP header, requests that the server retain the result of the Discover, Execute, etc., command contained in the SOAP body, in the session state for the present session within the server memory space. Thus, once the server detects the <KeepResult> element, the server knows to disregard its usual course of action, namely, clearing the query result from memory as soon as the result is sent to the client, and instead stores the result in memory to enable further processing of the results.

At step 407, the server executes the function requested by the client in the command discussed above in connection with step 405. For example, if the client requested a Discover command in the command of step 405, at step 407 the server would execute the Discover command. At step 409, the result of the function is stored. The result may be stored in memory, a data storage device, or the like. It will be appreciated that a memory in which the result can be stored need only be electronically accessible to the server, and does not need to be physically located at or near the server. At step 411, a <ResultID> element is sent from the server to the client. The <ResultID> elelment enables the client to reference the correct results in future commands to the server, as will be seen below in connection with steps 413-421. In one embodiment, the <ResultID> element is a string value, but it will be appreciated that any type of data and/or data format may be used to identify the stored results. Exemplary SOAP syntax for performing step 411, in one embodiment, is illustrated below in Table 2.

TABLE 2

```
<SOAP-ENV:Header>
   <Result
       xmlns="http://schemas.microsoft.com/analysisservices/2003/
       xmla"
       <ResultId>M111-O222-S333-H444-A555</ResultId>
   </Result>
</SOAP-ENV:Header>
```

It can be seen that in the embodiment illustrated above in Table 2 that <ResultId>, seen above in bold typeface, is a subelement of a <Result> element in the SOAP header of the server's response, although such a requirement is not required by an embodiment. Thus, in the embodiment illustrated above, a location of the query result is presented to the client along with the result ID.

At step 413, another command is received by the server from the client. Exemplary SOAP code for performing step 413, in one embodiment, is illustrated below in Table 3.

TABLE 3

```
<SOAP-ENV:Envelope
   xmlns:SOAP-ENV="http://schemas.xmlsoap.org/soap/envelope/"
   SOAP-ENV:encodingStyle="http://schemas.xmlsoap.org/soap/encoding/">
   <SOAP-ENV:Header>
      <Result
         xmlns="http://schemas.microsoft.com/analysisservices/2003/
         xmla"
         mustUnderstand="true">
         <ResultId>M111-O222-S333-H444-A555</ResultId>
      </Result>
   </SOAP-ENV:Header>
</SOAP-ENV:Envelope>
```

As can be seen in Table 3, above, and in an embodiment, when the client wants to access the stored result, the client also sends the <Result> element and the <ResultID> subelement to the server (the <ResultID> subelement is shown above in bold typeface). The server then accesses the stored result corresponding to the <ResultID> from the previous command within the session. At step 415, therefore, the function requested by the client is performed on the data by the server.

At step 417, the new result is returned to the client. As indicated by arrow A, in an embodiment if the client wishes to perform additional functions using the query results, the client need only return to step 413 and include the <Result> element and the <ResultID> subelement in the command. In contrast to the method 300 discussed above in connection with FIG. 3, the initial query need not be repeated, thereby saving processor time and reducing the complexity of the subsequent commands, as such commands do not need to re-query the analytical database.

At step 419, a clear or commit command is ultimately received by the server from the client. Exemplary SOAP code for performing step 419, in one embodiment, is illustrated below in Table 4.

TABLE 4

```
<SOAP-ENV:Header>
   <ClearResult
      xmlns="http://schemas.microsoft.com/analysisservices/2003/
      xmla"
      mustUnderstand="true">
      <ResultId>M111-O222-S333-H444-A555</ResultId>
   </ClearResult>
</SOAP-ENV:Header>
```

As can be seen in Table 4, above, when the result is no longer needed to be persisted, the <ClearResult> header is used (shown above in bold typeface). The <ClearResult> contains the corresponding <ResultID> value so as to instruct the server to clear the appropriate result from the location where the result is stored. Alternatively, during the sending of commands, a client may send an <UpdateCells> command to perform a writeback operation (not shown in Table 4 for clarity). In one embodiment, the Update Cells command contains a <Cell> element, which contains a <Value> element. When the server receives an <UpdateCells> command, the server adjusts all cells contained within the saved result to reflect the update (see step 421, below). Finally, when the client is finished with that particular result, the client sends the server a <ClearResult> element in the SOAP header, which also contains a <ResultId> subelement, identifying which result is to be cleared. Thus, it will be appreciated that step 419 may involve multiple commands to update the query results and a single command to clear the results. Accordingly, at step 421 the memory is cleared, or the results committed, according to the received command as discussed above in connection with step 419.

An embodiment of the present invention therefore enables an analytical database server to temporarily store data when such storage would be advantageous in view of the client's desired operations. It will be appreciated that the ability to selectively store data on the server can enable other useful functionality. For example, query plans are used in relational databases to optimize complex queries before actually querying the data in the database. As noted above, because conventional analytical databases do not have a mechanism for persisting data on the server temporarily, query plans have not been used to a significant degree in analytical database environments. According to an embodiment, however, such query plans may be implemented in an analytical database framework. As was also noted above, queries to analytical databases can be particularly complex, therefore the use of a query plan is desirable.

Figure 5:
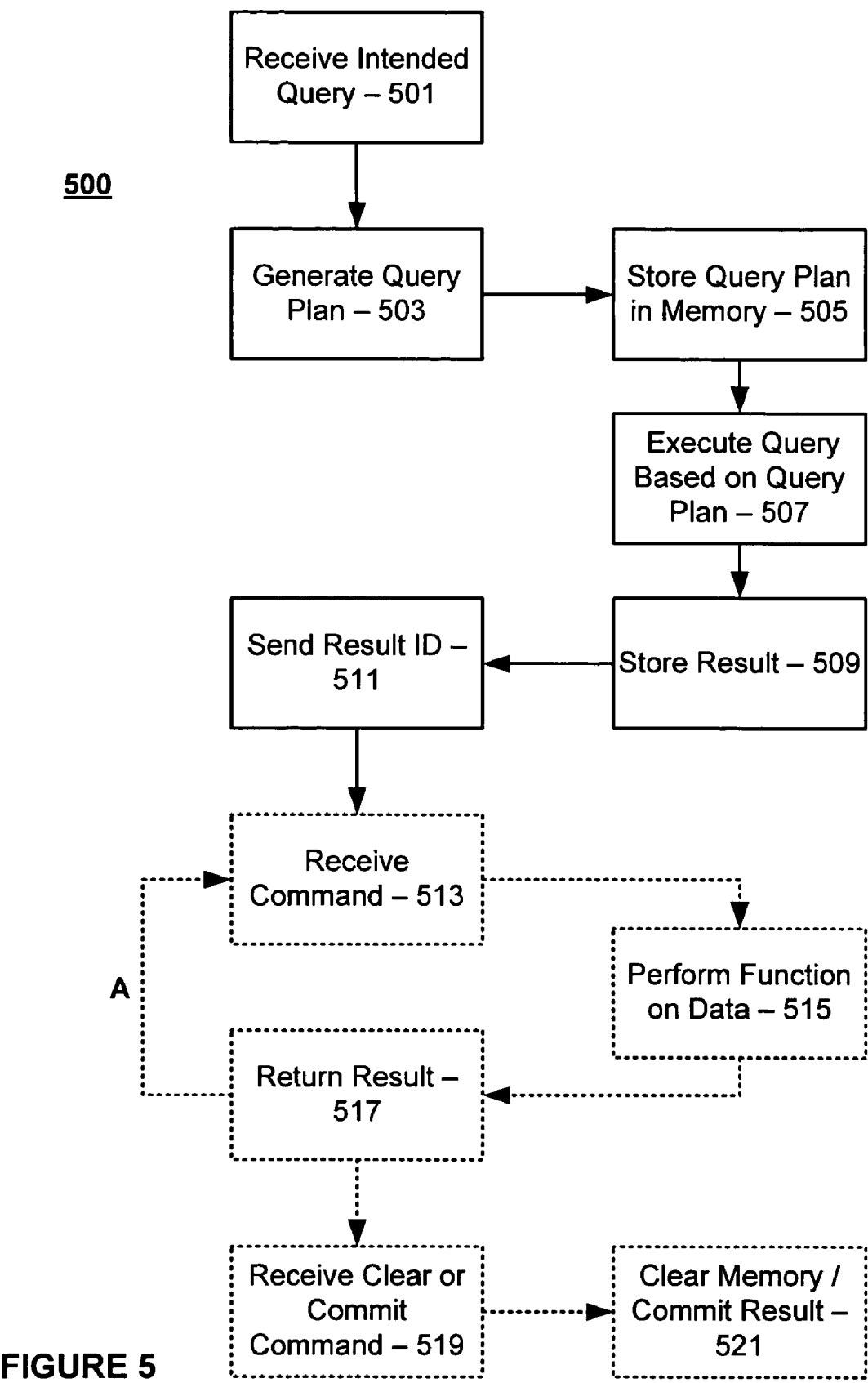
FIG. 5 is a flowchart illustrating an exemplary method of querying an analytical database using a query plan, according to an embodiment of the present invention.

Therefore, FIG. 5 illustrates an exemplary method 500 of querying an analytical database using a query plan according to an embodiment of the present invention. In FIG. 5, it will be appreciated that many steps are similar to those discussed above in connection with the method 400 of FIG. 4, except that the ability to temporarily store data on the server is additionally used to store a query plan in the server. For example, at step 501, a query request is received by the server from the client. At step 503, a query plan is generated. It will be appreciated that in some embodiments the server generates the query plan, while in other embodiments another computing device may generate the query plan. It will also be appreciated that any manner of generating such a query plan is equally consistent with an embodiment of the present invention.

At step 505, the query plan is stored at the server, and at step 507 the query is executed according to the query plan. At step 509, the result of the query is stored, such as was discussed above in connection with step 409 of FIG. 4. At step 511, a <ResultID> element is sent from the server to the client, such as was discussed above in connection with step 411 of FIG. 4. It will be appreciated that, in some embodiments, the method 500 returns the query results at step 511, which would enable the method 500 to end at such step 511. Thus, steps 513-521 are illustrated as being optional in FIG. 5, and it will be appreciated that any or all of such steps 513-521 may be present while remaining consistent with an embodiment of the present invention.

At optional step 513, another command is received by the server from the client, such as was discussed above in connection with step 413 of FIG. 4. At optional step 517, the new result is returned to the client, such as was discussed above in connection with step 417 of FIG. 4. As indicated by arrow A, in an embodiment if the client wishes to perform additional functions using the query results, the client need only return to step 513 and include the <Result> element and the <ResultID> subelement in the command. At step 519, a clear or commit command is ultimately received by the server from the client. Accordingly, at step 521 the results are cleared, or committed, according to the received command as discussed above in connection with steps 519 and 521.

Thus, a method and system for enabling the temporary storage of query results in an analytical database environment has been provided. While the present invention has been described in connection with the exemplary embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any type, number or configuration of electronic devices in any type of environment. Therefore, the present invention should not be limited to any single embodiment, but rather should be construed in breadth and scope in accordance with the appended claims.

What is claimed:

1. A method comprising:
receiving from a client a first header element and a request to query an analytical database, the first header element indicating whether a query result resulting from the request is to be stored;
querying the analytical database according to the request to produce the query result;
storing the query result according to the first header element only if the first header element indicates that such query result is to be stored; and
transmitting to the client an identifier associated with the stored query result and a second header element corresponding to the identifier,
the method further comprising:
receiving from the client a command with the identifier and the second header element, wherein the command corresponds to a function to be performed on the stored query result;
performing the function on the stored query result according to the command to produce a function result; and
transmitting to the client the function result.

2. The method of claim 1, further comprising transmitting the identifier and second header element with the function result.

3. The method of claim 1, wherein the query result is stored in a memory.

4. The method of claim 1, wherein the query result is stored in a data storage device.

5. The method of claim 1, further comprising receiving a commit command with the identifier and the second header element; and overwriting data in the analytical database with the query result responsive to the commit command.

6. The method of claim 1, further comprising receiving a clear command with the identifier and the second header element; and deleting the query result responsive to the clear command.

7. The method of claim 1, wherein the first and second header elements are Simple Object Access Protocol (SOAP) elements.

8. The method of claim 7, wherein the first header element is a <KeepResult> header element.

9. The method of claim 7, wherein the first header element is a <ResultID> header element.

10. A method comprising:
receiving from a client a request to query an analytical database, the request indicating that a query result resulting from the query is to be stored;
generating a query plan responsive to the request, wherein the query plan conesponds to an optimized method for carrying out the query;
storing the query plan;
executing the query according to the query plan to obtain the query result;
storing the query result as the request so indicates; and
transmitting to the client an identifier associated with the query result and a header element corresponding to the identifier,
the method further comprising:
receiving from the client a command with the identifier and the header element, wherein the command corresponds to a function to be performed on the stored query result;
performing the function on the stored query result according to the command to produce a function result; and
transmitting to the client the function result.

11. The method of claim 10, wherein the query plan and query result are stored in a memory.

12. The method of claim 10, wherein the query result is stored in a data storage device.

13. The method of claim 10, further comprising transmitting the query result and the header element.

14. The method of claim 10, further comprising transmitting the identifier and header element.

15. The method of claim 10, further comprising receiving a commit command with the identifier and the header element; and overwriting data in the analytical database with the query result responsive to the commit command.

16. The method of claim 10, further comprising receiving a clear command with the identifier and the header element; and deleting the query result responsive to the clear command.

17. The method of claim 10, wherein the header element is a Simple Object Access Protocol (SOAP) element.

18. The method of claim 17, wherein the header element is a <KeepResult> element.

19. A method performed with regard to a first header element incorporated in a request to query an analytical database, wherein the incorporated first header element indicates whether a query result resulting from the request is to be stored, the method comprising:
receiving from a client the first header element and query request;
querying the analytical database according to the query request to produce the query result;
storing the query result according to the first header element only if the first header element indicates that such query result is to be stored; and
transmitting to the client an identifier associated with the stored query result and a second header element corresponding to the identifier,
the method further comprising:
receiving from the client a command with the identifier and the second header element, wherein the command corresponds to a function to be performed on the stored query result;
performing the function on the stored query result according to the command to produce a function result: and
transmitting to the client the function result.

20. The method of claim 19, further comprising receiving a commit command with the identifier and the second header element; and overwriting data in the analytical database with the query result responsive to the commit command.

21. The method of claim 19, further comprising receiving a clear command with the identifier and the second header element; and deleting the query result responsive to the clear command.

22. The method of claim 19, wherein the query result is stored in a memory.

23. The method of claim 19, wherein the query result is stored in a data storage device.

24. A method for communicating between a client process and a server process in a distributed processing system, comprising the steps of:

incorporating, by the client process, a <KeepResult> header element in a request to query an analytical database;

receiving, by the server process from the client process, the <KeepResult> header element and the query request, wherein the <KeepResult> header element indicates that a query result resulting from the request is to be stored;

querying, by the server process, the analytical database according to the request to produce the query result;

storing, by the server process, the query result according to the <KeepResult> header element only if such <KeepResult> header element indicates that such query result is to be stored; and transmitting, by the server process to the client process, an identifier associated with the stored query result and a <ResultID> header element corresponding to the identifier, the method further comprising:

transmitting, by the client process to the server process, a command with the identifier and the <ResultID> header element, wherein the command corresponds to a function to be performed on the stored query result;

performing, by the server process, the function on the stored query result according to the command to produce a function result; and transmitting, by the server process to the client process, the function result.

25. The method of claim 24, wherein the server process stores the query result in a memory.

26. The method of claim 24, wherein the server process stores the query result in a data storage device.

27. The method of claim 24, further comprising transmitting, by the server process, the identifier and <ResultID> header element.

28. The method of claim 24, further comprising transmitting, by the client process, a commit command with the identifier and the <ResultID> header element; and overwriting, by the server process, data in the analytical database with the query result responsive to the commit command.

29. The method of claim 24, further comprising transmitting, by the client process, a clear command with the identifier and the <ResultID> header element; and deleting, by the server process, the query result responsive to the clear command.

* * * * *

UNITED STATES PATENT AND TRADEMARK OFFICE
CERTIFICATE OF CORRECTION

PATENT NO.       : 7,328,207 B2                          Page 1 of 1
APPLICATION NO.  : 10/922517
DATED            : February 5, 2008
INVENTOR(S)      : Marius Dumitru et al.

It is certified that error appears in the above-identified patent and that said Letters Patent is hereby corrected as shown below:

In column 13, line 62, in Claim 10, delete "conesponds" and insert -- corresponds --, therefor.

In column 14, line 54, in Claim 19, delete "result:" and insert -- result; --, therefor.

Signed and Sealed this

Fifteenth Day of February, 2011

David J. Kappos
*Director of the United States Patent and Trademark Office*